United States Patent [19]

Mattes et al.

[11] Patent Number: 4,641,041

[45] Date of Patent: Feb. 3, 1987

[54] CIRCUIT ARRANGEMENT FOR REGISTERING FALSE RELEASE SIGNALS FOR A RESTRAINT SYSTEM

[75] Inventors: Bernhard Mattes, Sachsenheim; Eberhard Mausner, Linz; Wadym Suchowerskyj, Leonberg, all of Fed. Rep. of Germany

[73] Assignee: Robert Bosch GmbH, Stuttgart, Fed. Rep. of Germany

[21] Appl. No.: 746,297

[22] Filed: Jun. 19, 1985

[30] Foreign Application Priority Data

Jul. 10, 1984 [DE] Fed. Rep. of Germany ....... 3425281

[51] Int. Cl.$^4$ ..................... B60R 21/08; H01H 35/14
[52] U.S. Cl. ............................. 307/10 R; 307/105 B; 280/728; 280/729; 340/52 R; 340/52 H; 180/282
[58] Field of Search .......................... 307/10 R, 105 B; 280/728, 729, 730, 731, 732, 733, 734, 735, 736, 737, 801–805; 340/52 R, 52 F, 52 H, 735; 297/330, 468, 469, 470, 472–478, 487, 488; 180/282

[56] References Cited

U.S. PATENT DOCUMENTS

| | | | |
|---|---|---|---|
| 3,622,974 | 11/1971 | Best | 340/52 R |
| 3,629,816 | 12/1971 | Gillund | 340/52 H |
| 3,668,627 | 6/1972 | Brainerd | 340/52 H |
| 3,750,100 | 7/1973 | Ueda | 340/52 H |
| 3,762,495 | 10/1973 | Usui et al. | 280/735 |
| 3,851,305 | 11/1974 | Baba et al. | 340/52 H |
| 3,870,894 | 3/1975 | Brede et al. | 340/52 H X |
| 3,889,232 | 6/1975 | Bell | 340/52 H |
| 3,890,594 | 6/1975 | Hosaka et al. | 340/52 H |
| 3,911,391 | 10/1975 | Held et al. | 280/735 X |
| 3,931,527 | 1/1976 | Oishi et al. | 280/735 X |
| 3,949,357 | 4/1976 | Hosaka | 340/52 H |
| 4,016,426 | 4/1977 | Nishioka | 340/52 H X |
| 4,059,822 | 11/1977 | Toshioka et al. | 340/52 H |
| 4,166,641 | 9/1979 | Okada et al. | 280/735 |
| 4,243,971 | 1/1981 | Suchowerskyj et al. | 340/52 H |
| 4,346,913 | 8/1982 | Schrauf et al. | 280/735 |
| 4,366,465 | 12/1982 | Veneziano | 340/52 R |
| 4,410,875 | 10/1983 | Spies et al. | 340/52 H |
| 4,497,025 | 1/1985 | Hannoyer | 340/52 H X |

Primary Examiner—Charles D. Miller
Assistant Examiner—Shik Luen Paul Ip
Attorney, Agent, or Firm—Walter Ottesen

[57] ABSTRACT

The invention is directed to a circuit arrangement for the recording of false release signals for a restraint system such as an air bag system or a seat belt tensioning system in a vehicle. In this circuit arrangement, a release circuit including a first deceleration sensor and an evaluation circuit generates a release signal in the event of a deceleration caused by an accident. This release signal, however, becomes effective only if, at the same time, a second release circuit including a second deceleration sensor 17 responds, thereby triggering the restraint system. A monitoring circuit for monitoring the occurrence of a release signal without a concurrent response of the second release circuit will activate a warning device and inform the operator of the vehicle of the malfunction.

7 Claims, 2 Drawing Figures

CIRCUIT ARRANGEMENT FOR REGISTERING FALSE RELEASE SIGNALS FOR A RESTRAINT SYSTEM

Field of the Invention

The invention relates to a circuit arrangement for the registering of false release signals for a restraint system in a vehicle.

BACKGROUND OF THE INVENTION

Restraint systems of this type which are conventionally configured as air bag or seat belt tensioning devices are known, for example, from U.S. Pat. Nos. 3,622,974 and 3,874,695 and from the journal "ATZ Automobiltechnische Zeitschrift 84", (1982), 2, pages 77 to 83. In these systems, the restraint system is triggered by an ignition circuit if the deceleration signal sensed by at least one deceleration sensor meets predetermined conditions as they occur in an accident-related deceleration.

European Pat. No. 22146 discloses a circuit arrangement of the type referred to above. This arrangement, however, determines subsequently the cause for an erroneous release of the restraint system. False release signals of a release circuit which do not trigger the restraint system are not detected.

Finally, European Pat. No. 11680 discloses a circuit arrangement for checking release signals wherein a deceleration signal is simulated by the circuit and a corresponding release signal is tested by a sequence of predetermined testing steps. In this arrangement, the restraint system is prevented from being triggered during the test program. No check is performed on erroneous release signals produced by the deceleration sensor.

SUMMARY OF THE INVENTION

The circuit arrangement of the invention affords the advantage of reliably signaling to the vehicle operator that false release signals have been issued by a release circuit because of a deceleration sensor while, at the same time, preventing an erroneous triggering of the restraint system.

Of particular advantage is that false release signals are monitored with respect to time by a timing unit, particularly a time delay unit. This prevents the warning device from being activated as a result of very short noise pulses.

BRIEF DESCRIPTION OF THE DRAWING

The invention will now be described in more detail in the following with reference to the drawing wherein.

DESCRIPTION OF THE PREFERRED EMBODIMENTS OF THE INVENTION

Figure 1:
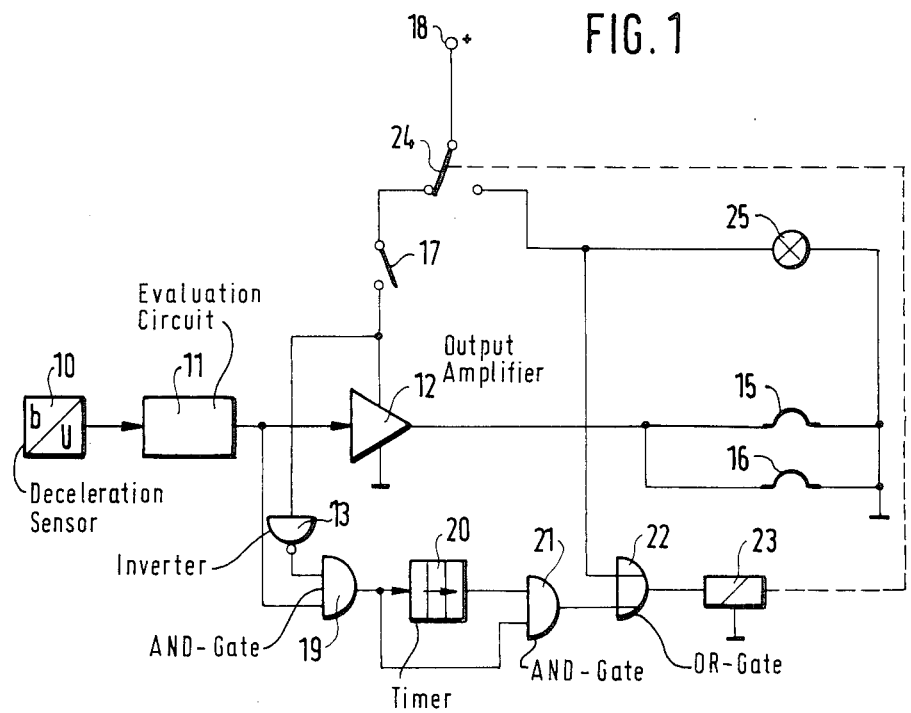
FIG. 1 is a circuit arrangement according to the invention.

The output signal of a deceleration sensor 10 is applied to an evaluation circuit 11. In the event of an accident-induced deceleration, the evaluation circuit 11 supplies a release signal to an output amplifier 12. The output amplifier 12 controls two ignition devices 15, 16 having their second terminals connected to ground. The ignition devices 15, 16 ignite chemical propellants contained in restraint systems such as air bag or seat belt tensioning devices, for example. They inflate the air bag or tighten the seat belt.

To increase operating reliability, a second release circuit is provided which essentially includes a second deceleration sensor 17 preferably configured as a mercury switch as described in more detail in European Pat. No. 22146. This second deceleration sensor 17 is equipped with a lower release threshold. When this threshold value is exceeded, deceleration sensor 17 closes the connection between a voltage-carrying terminal 18 and output amplifier 12.

It is to be understood that a more complex second release circuit may be substituted for the mercury switch. The important matter here is that the restraint system or systems are triggered only if both a release signal is produced at the output of evaluation circuit 11 and the second deceleration sensor detects that a deceleration threshold has been exceeded.

The arrangement containing components 10 to 18 described above is known from the state-of-the-art initially referred to and is described therein in detail, so that a more detailed description of the release mechanism is not required.

The output of evaluation circuit 11 is conducted to an input of an AND-gate 19 which has its second input connected to the output of an inverter 13. Inverter 13 checks whether the second deceleration sensor 17 has responded. The output of AND-gate 19 is connected via a time delay element 20 to a first input of a second AND-gate 21. The output of AND-gate 19 is also connected directly to the second input of AND-gate 21. The output of AND-gate 21 is connected to the magnet winding 23 of a relay via an OR-gate 22. Magnet winding 23 controls a two-way contact 24 of this relay. The contact 24 is shown in the position for which the magnet winding 23 is deenergized. In this first position, contact 24 closes the connection between terminal 18 and second deceleration sensor 17; whereas, in its second position, the contact 24 connects terminal 18 to the second input of OR-gate 22 as well as to a warning device 25 configured as a warning lamp. The second terminal of warning device 25 is connected to ground.

The operation of the circuit arrangement of FIG. 1 will now be explained with reference to the signal diagram of FIG. 2.

The operation essentially includes first a check to establish whether a release signal is present at the output of evaluation circuit 11 although no critical deceleration has been detected by the second deceleration sensor 17 which is therefore open. If this condition is present, a signal U19 is produced at the output of AND-gate 19. The duration of this signal corresponds to the duration of the release signal at the output of evaluation circuit 11 with the second deceleration sensor 17 not having responded. Signal U19 is a false signal because the second deceleration sensor 17 is supposed to respond in every instance first or at least simultaneously with the first sensor because the second deceleration sensor 17 has a lower release threshold. Signal U19 appears at the output of the time delay element as signal U20 which is delayed by an amount $t_o$. The time $t_o$ indicates the limit value below which false release signals are still recognized as noise signals which are not to be registered. This applies to the first case illustrated in FIG. 2 with reference to signal U19.

Figure 2:
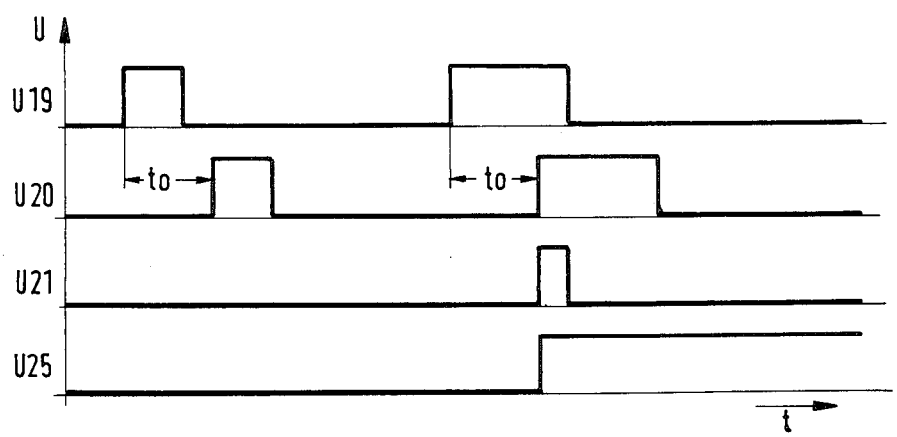
FIG. 2 is a signal diagram to aid in explaining the operation of the circuit arrangement of FIG. 1.

In the second case illustrated in FIG. 2, the duration of signal U19 is longer than time $t_o$, resulting in overlapping of signals U19 and U20. This condition produces signal U21 at the output of AND-gate 21. Signal U21 excites the winding of relay 23, 24 via OR-gate 22 and causes contact 24 to switch to its second position. In this second position, the warning device 25 or the warning lamp is switched on while at the same time the supply of current to output amplifier 12 is interrupted so that from this instant on any further triggering of a restraint system is prevented. By feeding the positive voltage signal back to the second input of OR-gate 22, relay 23, 24 holds itself in the energized condition so that the warning device 25 remains switched on until the power supply is again interrupted by switching off the ignition of the vehicle. The warning device 25 informs the operator of the vehicle that a false release signal was produced and that proper functioning of the restraint system is no longer ensured. Accordingly, the system would have to be checked or exchanged.

It is to be understood that a semiconductor switch with self-holding effect such as a thyristor or a suitable self-holding semiconductor circuit may be substituted for the relay 23, 24.

It is to be understood further that a normally closed deceleration switch, which opens in the event that a deceleration threshold is exceeded, may be substituted for a normally open deceleration sensor 17 which is configured as a deceleration switch and, in the event of a predetermined deceleration being exceeded, is closed. The negative voltage signal produced in the event of a deceleration could be used to release an output, for example.

It is understood that the foregoing description is that of the preferred embodiments of the invention and that various changes and modifications may be made thereto without departing from the spirit and scope of the invention as defined in the appended claims.

What is claimed is:

1. A circuit arrangement for registering false release signals for a restraint system in a motor vehicle wherein the restraint system includes first release circuit means for generating a first release signal in response to an accident-related deceleration of the vehicle, said first release circuit means including a first deceleration sensor and an evaluation circuit connected to the latter; second release circuit means for responding to a predetermined threshold level of deceleration by generating a second release signal; and, actuating circuit means for actuating said restraint system in response to said first release signal only upon the occurrence of said second release signal simultaneoulsy with said first release signal; said circuit arrangement for registering false release signal comprising:

monitoring circuit means connected to said evaluation circuit for ascertaining the occurrence of said first release signal in the absence of said second release signal from said second release circuit means; and, warning means responsive to the output of said monitoring circuit means for registering the presence of said first release signal in the absence of said second release signal from said second release means thereby establishing said first release signal occurring in this manner as a false release signal.

2. The circuit arrangement of claim 1, comprising:

timer means connected to the output of said monitoring circuit means for holding said first release signal a predetermined length of time; and, switching circuit means for switching on said warning means in response to a release signal having a duration greater than said predetermined length of time.

3. The circuit arrangement of claim 2, said timer means being a time delay circuit; and, said switching circuit means including ancillary circuit means for switching on said warning means in the simultaneous presence of said first release signal from both said monitoring circuit means and said time delay means.

4. The circuit arrangement of claim 2, said warning means comprising: a warning device for registering the presence of said false release signal; and, said switching circuit means including self-holding circuit means for switching said warning device on in the presence of said false release signal.

5. The circuit arrangement of claim 4, said self-holding circuit means being a self-holding relay.

6. The circuit arrangement of claim 4, said self-holding circuit means being thyristor means.

7. The circuit arrangement of claim 1, said warning means comprising: a warning device for registering the presence of said false release signal; and, switching means for deactivating said release circuit means and for switching on said warning device in response to said release signal in the simultaneous absence of said response from said second release circuit means.

* * * * *